July 21, 1964  H. PÖHLER ETAL  3,141,230
PROCESS FOR MANUFACTURING BEARING RACES
Filed Dec. 9, 1960  3 Sheets-Sheet 1

Inventors:
Heinz Pöhler
Wolfgang Schmude
BY Michael S. Striker
Attorney

July 21, 1964   H. PÖHLER ETAL   3,141,230
PROCESS FOR MANUFACTURING BEARING RACES
Filed Dec. 9, 1960   3 Sheets-Sheet 2

United States Patent Office 3,141,230
Patented July 21, 1964

3,141,230
PROCESS FOR MANUFACTURING
BEARING RACES
Heinz Pöhler, Westhofen, Westphalia, and Wolfgang
Schmude, Dusseldorf, Germany, assignors to Eisenwerk Rothe Erde G.m.b.H., Dortmund, Germany
Filed Dec. 9, 1960, Ser. No. 74,864
Claims priority, application Germany Dec. 12, 1959
9 Claims. (Cl. 29—148.4)

The present invention relates to a method of making bearings.

More particularly, the present invention relates to ball bearings of extremely large diameter, on the order of one meter or more. In bearings of this type the races are not only made up of annular bodies of metal such as steel, but in addition these annular bodies carry wire rings of steel which are directly engaged by the balls of the bearings so that these balls roll on the wire rings which are carried by the annular bodies of the races.

A particular problem resides in providing bearings of this type with sufficient stiffness and rigidity as well as with the desired amount of accuracy, and also because of the large size these bearings are unusually heavy which is a further disadvantage.

It is therefore one of the primary objects of the present invention to provide a method of making a bearing of the above type which is very light in weight, particularly as compared to conventional bearings of the above type.

The lightness in the weight of the bearing of the invention is brought about by using a light metal alloy for the annular bodies of the races which carry the wire rings which are directly engaged by the ball members. Particular problems arise when dealing with such light metals. In the treatment of these light metals there are certain residual internal stresses which make it very difficult to machine such materials accurately. Furthermore when a bearing race of light metal is connected to a support of a metal such as steel or the like, particular problems arise because of the different coefficients of thermal expansion so that when the temperature changes the light metal will expand or contract to a degree greater than the steel support, and measures must be taken to compensate for these different rates of expansion and contraction resulting from temperature changes.

It is accordingly a further object of the present invention to provide a process of manufacturing light metal bearing races in such a way that these races can be very accurately formed with the desired precision without encountering the problems heretofore encountered with respect to the internal stresses.

A further object of the present invention is to provide a light metal bearing race which will have a very great strength far beyond the strength which is conventionally expected of elements made from light metals.

An additional object of the present invention is to provide a means for connecting light metal bearing races to a support in such a way that the different rates of expansion and contraction of the light metal bearing race and the support to which it is connected can be compensated for without in any way disturbing the operation of the bearing.

With the above objects in view the invention includes, in a process for manufacturing bearing races, the steps of heating a light metal alloy ring of uniform cross section to a temperature higher than the solubility temperature of the alloy. This ring which is to be used as a bearing race body for carrying a wire ring which is contacted by the balls of the bearing is quenched after it is heated to the temperature higher than the solubility temperature. After quenching the ring is placed on an apparatus which is capable of uniformly increasing the diameter of the ring, and the increase in diameter is carried out to such a degree that the ring will remain permanently at the increased diameter. Thereafter the ring is aged either artificially or naturally depending upon the particular components of the alloy, and finally the ring may be machined to the desired cross sectional configuration required for the particular bearing. In some cases the ring is machined just prior to the step of increasing its diameter so that the ring will present exceedingly smooth surface to the structure which acts on the ring to increase the diameter.

Also in accordance with the present invention there is provided, in a bearing assembly, a light metal bearing race and a support for this race, the support having a coefficient of thermal expansion which is substantially smaller than that of the race. A connecting means connects the race to the support so that the race is carried by the support, and this connecting means of the invention connects the race to the support for limited movement with respect thereto so that during temperature changes the race can move with respect to the support to compensate for the different rates of expansion and contraction of the support and race resulting from temperature changes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4:
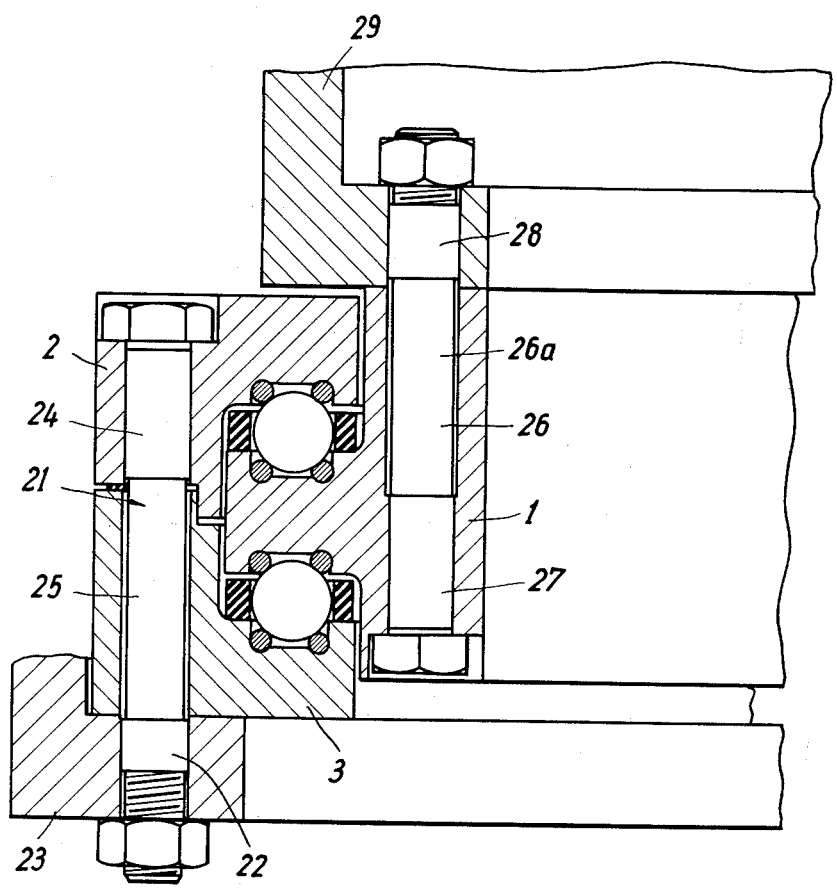
Figure 5:
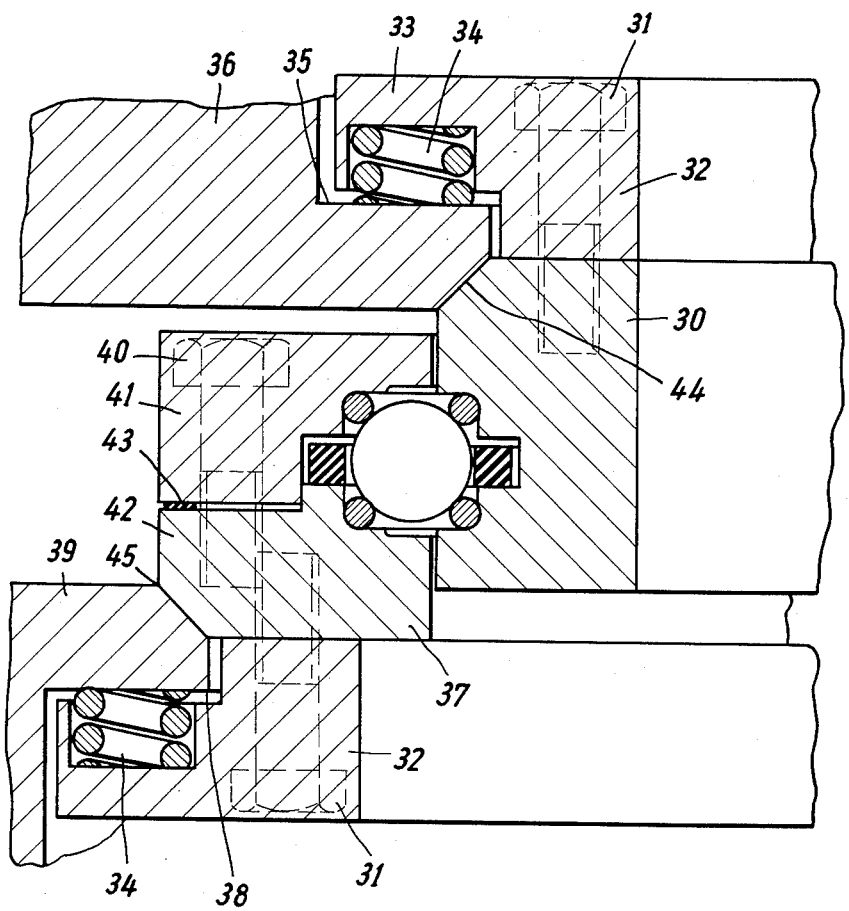

FIG. 4 is an axial section through one side of a bearing of the invention illustrating the structure of the invention for connecting the bearing to a support made of a metal different from the light metal of the bearing races; and FIG. 5 is a fragmentary axial section through one side of a bearing of the invention illustrating another embodiment of a structure for connecting the light metal bearing to a support of steel or the like.

Figure 1:
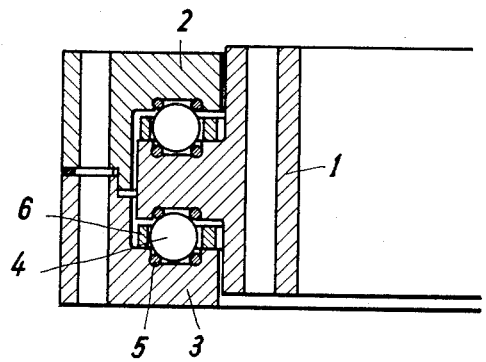
FIG. 1 is an axial section through one side of one embodiment of a bearing according to the present invention.

Referring now to FIG. 1 there is illustrated therein a bearing of the invention. This bearing includes an inner ring 1 forming the inner race of the bearing. It is to be understood that while the member 1 is referred to as the inner bearing race because the member 1 is made of a light metal it actually does not engage the balls 4 and carries wire rings of steel or the like for this purpose. The inner bearing race 1 is of a substantially T-shaped cross section with the leg of the T extending horizontally and the cross bar of the T extending vertically as indicated in FIG. 1 so that the race 1 includes an outer annular flange. This flange is received within the outer race means of the bearing, and this outer race means is formed by a pair of races 2 and 3, the race 2 being located over the race 3 and both of these races having an angular cross section, as indicated in FIG. 1. The particular bearing illustrated in FIG. 1 includes two series of ball members 4, and each circular row of balls 4 engages four wire rings of steel or the like which are directly carried by the races 1–3 in the manner shown in FIG. 1 where the wire rings 5 are illustrated. Such wire rings 5 are well known in the art and therefore are not further described. Each circular row of balls cooperates with a cage 6 which is also conventional and which is formed with a series of openings in which the balls 4 are respectively located, as is well known.

The bearing which is illustrated in FIG. 1 does not differ in its outer configuration and in its load-carrying capacity for conventional wire race bearings where the wire rings are carried in steel races. According to the invention the races 1–3 are made of a light metal without sacrificing precision and at the same time gaining the great advantage of a great reduction in weight.

In order to manufacture races such as the races 1–3 shown in FIG. 1, the race blanks have the configuration shown in FIGS. 2 and 3 where the race blank 7 which subsequently becomes one of the races 2 or 3 and the race blank 8 which subsequently becomes the race 1 are respectively illustrated, of course on a smaller scale than in FIG. 1. After being manufactured according to the process of the invention the blank 7 which is of square cross section is machined so as to have the configuration of the race 2 or the race 3, and the blank 8 is machined so as to have the configuration of the race 1.

These blanks 7 and 8 according to one example may be made from a light metal alloy which is highly ductile and malleable so that the alloy can be stretched. In one example of the invention the alloy is composed of aluminum, zinc, magnesium and copper, and the copper is present in the alloy in the amount of from 0.5 to 1.5%.

Each of the annular blanks 7 and 8 is manufactured by piercing a plate and rolling the pierced plate out so as to form a seamless ring. During this rolling of the pierced plate into the seamless ring the material may be heated, and after the seamless ring is formed this ring is again heated. In accordance with the invention the ring at this stage of the process is heated very accurately and uniformly to a temperature somewhat higher than the solubility temperature of the alloy. This is known in the art as solution heat treatment according to which the alloy is heated to a high temperature at which the alloying element is relatively soluble in the aluminum, and this temperature is maintained until solution is complete, and thereafter the ring is quenched. With the particular alloy referred to above the solubility temperature is 460° C. so that in accordance with the present invention the ring is heated to a temperature somewhat higher than 460° C. and then the ring is quenched in a salt bath. The ring is maintained in the quenching bath for approximately 20 minutes. Upon removal of the ring from the bath the ring is machined on a suitable lathe or the like so that in the case of the blank 7 the ring will be provided with the cross section indicated in FIG. 2 while in the case of the blank 8 the ring will be provided with the cross section indicated in FIG. 3. The race blanks are then stretched so as to have their diameters increased, and in FIGS. 2 and 3 are shown two different embodiments of structure for increasing the diameters of the rings according to the process of the invention. While the blank 7 is shown with the diameter increasing structure of FIG. 2 and the blank 8 with the diameter increasing structure of FIG. 3, it is to be understood that the blank 8 may have its diameter increased with the structure of FIG. 2 and the blank 7 may have its diameter increased with the structure of FIG. 3.

Figure 2:
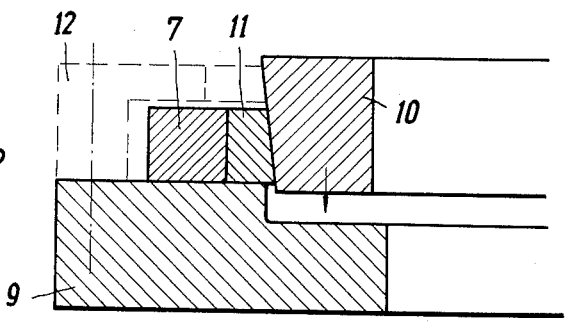
FIG. 2 is an axial section fragmentarily illustrating one possible embodiment of a structure for increasing the diameter of a ring which is to be formed into a race of the bearing of the invention.
Figure 3:
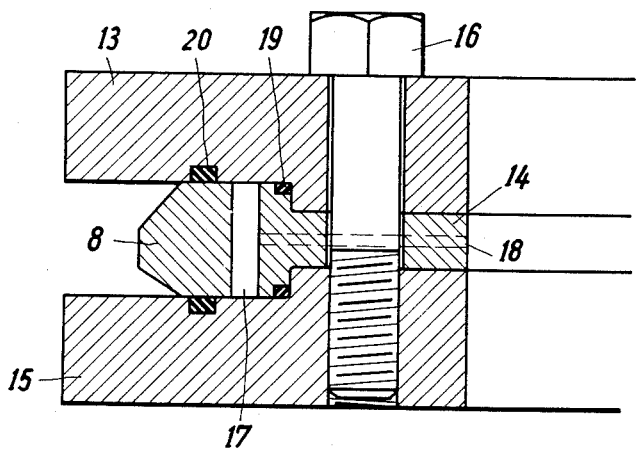
FIG. 3 is a fragmentary axial section diagrammatically illustrating another embodiment of a structure for increasing the diameter of a ring to be used as a race of a bearing of the invention.

It will be noted from FIGS. 2 and 3 that the blanks 7 and 8 are symmetrical with respect to a plane midway between the upper and lower faces of each blank and normal to the axis thereof. As a result of this symmetrical construction there are no forces which tend to twist the blank during the increase in the diameter thereof. Thus, it will be seen that the blank 7 is of a square cross section while the blank 8 is of a similar cross section except that at its outer periphery it is frustoconical at its upper and lower faces.

The diameter increasing structure of FIG. 2 includes a table 9 and a spreading ring 10 which has an outer frustoconical surface as indicated in FIG. 2. This outer frustoconical of the spreading ring 10 is engaged by a row of elements 11 which are closely spaced one next to the other, and these elements 11 are carried by the upper face of the table 9 and engage the inner periphery of the blank 7 in the manner indicated in FIG. 2. The structure may also include a hood 12, if desired, and since the hood 12 is optional it is indicated in dotted lines in FIG. 2. The elements 11 which transmit the spreading force from the spreading ring 10 to the blank 7 extend along a complete circle and have inner surfaces of the same conicity as the outer surface of the spreading ring 10. The exterior surfaces of the elements 11 are in engagement with the inner cylindrical periphery of the ring 7 and of substantially the same curvature as the inner peripheral surface of the ring 7. A hydraulically driven piston or a crank-driven ram engages the spreading ring 10 and moves the latter downwardly along its working stroke, as indicated by the arrow in FIG. 2, and during downward movement of the spreading ring 10 the diameter of the blank 7 is increased. The extent to which the diameter is increased is such that the ring 7 will remain at the increased diameter to which it has been stretched without tending to contract, and the extent of diameter increase also is such that all along the entire ring 7 there is a substantial reduction and substantial elimination of internal stresses which would remain in the ring if the increase in diameter were relatively small.

When the blank 7 is removed from the structure of FIG. 2 it is flat and perfectly circular. Because of the substantial reduction of internal stresses the blank remains flat and circular when it is later placed on a lathe or the like so as to be machined by being turned to have the cross sectional configuration indicated for the races 2 and 3 of FIG. 1.

The diameter increasing structure of FIG. 3 includes an upper ring 13, an intermediate ring 14, and a lower ring 15, all of which are coaxial and held together by screws 16 so as to form a unitary annular assembly. The ring 14 while having the same inner diameter as the rings 13 and 15 has a much smaller outer diameter so as to provide between the rings 13 and 15 the annular space 17 in which the ring 8 is located. Of course, in order to locate the ring 8 in the space 17 as well as to remove it from the space 17 the screws 16 are removed and the ring 13 is disassembled. After the ring 8 is placed on the ring 15 surrounding the ring 14 the ring 13 is replaced and the screws 16 again interconnect the rings 13–15. The ring 14 is formed with a bore 18 which communicates at the inner periphery of the ring 14 with a source of hydraulic fluid under pressure, and thus this hydraulic fluid under pressure will flow through the bore 18 into the space 17 to fill the annular gap between the ring 14 and the blank 8. Sealing rings 19 are provided between the ring 14 and the rings 13 and 15, respectively, as indicated in FIG. 3, and in addition the rings 13 and 15 respectively carry sealing rings 20 which engage the upper and lower faces, respectively, of the ring 8. The hydraulic fluid under pressure which fills the gap between the rings 14 and 8 acts on the ring 8 to increase the diameter thereof, and this increase in diameter is carried out to the extent described above in connection with the blank 7 so as to produce the results referred to above.

After the step of increasing the diameter of the blanks 7 or 8 and before the final machine of these blanks, the blanks are hardened and strengthened by a heat treatment known as artificial aging. With the particular alloy referred to above, the artificial aging in connection with the increase in the diameter of the blank has the great advantage of producing a much greater strength in the material than if natural aging took place at room temperature after the increase in diameter. This advantage may not be obtained with all alloys, however, and in some cases as where the bearing is required to carry only a relatively small load the blank can be permitted to age naturally after its diameter is increased. The essential increase in the strength of the race is provided by the increase in the diameter thereof, and then in some cases as with the above-described alloy the strength will be further increased by artificial aging.

As has been indicated above because the bearing races of the invention are made of a light metal which has a relatively high coefficient of thermal expansion, particular problems arise when mounting these races on supports of metal such as steel which have a much lower coefficient of thermal expansion. The present invention provides also a solution to the problem of mounting bearings of light metal on such supports in such a way as to take care of the problems arising from the different degrees of expansion and contraction resulting from temperature changes.

Thus, referring to FIG. 4 it will be seen that the outer races 2 and 3 of the bearing of FIG. 1 are formed with aligned bores which receive the screw 21. This screw 21 extends through an aligned bore formed in a support 23 made of steel, for example. The screw 21 is provided at its lower end with a portion 22 which has a tight fit in the bore of the support 23, and the opposite end portion of the screw 21 adjacent to its head is provided with a portion 24 which has a tight fit in the bore of the race 2 which with the race 3 forms the light metal race means of the embodiment of FIGS. 1 and 4. In accordance with the present invention the screw 21 has a shank portion 25 of reduced diameter as compared to the portions 22 and 24 between which the shank portion 25 extends, and as a result the screw 21 extends with substantial clearance through the bore of the race 3 which is aligned with the bore of the support 23. Thus, this screw 21 together with the portions of the support 23 and race means 2, 3 provided with the aligned bores through which the screw 21 extends forms a connecting means which connects the race means to the support 23, and this connecting means enables the race means to have a limited degree of movement with respect to the support 23 to compensate for different rates of expansion and contraction resulting from temperature changes. When there is an increase in temperature the bearing will of course tend to expand to a degree greater than the support 23, and because of the portions 22 and 24 of the screw 21 which have a tight fit the expansion of the bearing with respect to the support will result in a slight bending or curving of the shank portion 25 so that this shank portion 25 will have a substantially S-shaped configuration. It is easily possible for the screw 21 to assume this curvature inasmuch as the shank portion 25 is relatively long. Of course, there are several screws 21 distributed about the common axis of the bearing and its support, with the result that when the temperature again falls the screws will resiliently move back to their original straight condition and in so doing will center the bearing with respect to the support, so that in this way the structure of FIG. 4 guarantees that the bearing will at all times remain precisely centered. Of course, the screws 21 are uniformly distributed about the axis of the bearing so as to have this centering effect.

The inner race 1 is connected to the support 29 in the same way that the outer race means 2, 3 is connected to the support 23. Thus, the race 1 is formed with an axial bore aligned with a bore of the inner flange of the support 29, and the screw 26 has portions 27 and 28 which have a tight fit in the bores of the race 1 and the support 29. Between its tight-fitting portions 27 and 28 the screw 26 has a shank 26a of reduced diameter to provide the clearance shown in FIG. 4, and this clearance will enable shifting of the race 1 with respect to the support 29 to compensate for different rates of expansion and contraction resulting from temperature changes in the same way as described above in connection with the screw 21. Thus, the shank 26a will assume a substantially S-shaped configuration resulting from expansion due to a temperature increase, and inasmuch as a plurality of the screws 26 are uniformly distributed about the axis of the bearing these screws 26 will have also a centering influence when the temperature drops.

The bearing shown in FIG. 5 includes only one series of ball members although the supporting arrangement of FIG. 5 may be used equally well with a bearing having two series of ball members. The steel support members 36 and 39 are provided to carry the bearing structure of FIG. 5. The support 36 has a flange which is provided with a frustoconical surface 44 while the support 39 has a flange provided with the frustoconical surface 45. The bearing of FIG. 5 includes the light metal rings 37 and 41 which together form the outer race means of the bearing, it being understood that the bearing includes the circular wire members which are directly engaged by the ball members and which are carried by the light metal race members. A screw 40 is shown in FIG. 5 holding the outer race rings 41 and 42 together and of course a plurality of such screws 40 are provided and are uniformly distributed about the axis of the bearing so as to form a single assembly from the outer light metal rings 41 and 42, and in this way the outer bearing race means 37 is formed. An annular shim 43 whose thickness may be selected in a well known manner is provided between the rings 41 and 42 so as to very accurately determine the cooperation of the races 41 and 42 with the ball members. The bearing also includes the inner race 30 made of light metal, and it will be noted that the inner race 30 has an outer frustoconical surface of the same conicity as and engaging the frustoconical surface 44 of the support 36 in the manner indicated in FIG. 5. In the same way the ring 42 has an outer beveled periphery of the same conicity as and engaging the frustoconical surface 45 of the support 39. These engaging frustoconical surfaces function as part of the connecting means for connecting the light metal bearing to the support structure which is made of a metal having a coefficient of expansion substantially smaller than that of the light metal used for the bearing races.

In accordance with the invention a pair of rings 32 are respectively fixed by the screws 31 to the rings 42 and 30, and it will be seen that each of the rings 32, which are also made of light metal, has an outer flange overlapping the face of the flange of the support 36 or 39 which is directed away from the frustoconical surface 44 or 45 thereof, respectively. Thus, it will be seen that the flange 33 of the upper ring 32 of FIG. 5 overlaps the face 35 of the flange of the support 36, this face 35 being directed away from the frustoconical surface 44, while the outer flange of the lower ring 32 overlaps the face 38 of the flange of the support 39, and this latter face 38 is directed away from the frustoconical surface 45. While the faces 35 and 38 are overlapped by the flanges of the rings 32, these flanges are nevertheless spaced from the faces 35 and 38, respectively, and at the faces which are directed toward the faces 35 and 38 the flanges of the rings 32 are respectively formed with recesses which receive the coil springs 34 which are under compression, and these coil springs respectively press against the faces 35 and 38. Thus, the coil springs 34 act as a spring means urging the pairs of frustoconical surfaces together, and in this way the spring means together with the flanges of the supports and rings 32 as well as together with the frustoconical surfaces form a connecting means connecting the bearing of FIG. 5 to the support for limited movement with respect thereto to compensate for different rates of expansion and contraction resulting from temperature changes. It will be noted that during contraction and expansion resulting from temperature changes a slight degree of axial movement of the bearing will take place with respect to the support, and the springs 34 serve to yield in order to compensate for this slight axial movement.

When the bearing structure of FIG. 5 becomes heated the light metal rings will expand at approximately twice the rate of the steel rings and thus the rings 30 and 42 will respectively slide along the surfaces 44 and 45. This sliding takes place by overcoming the friction resulting from the compression of the springs 34 as well as from the effective weight of the bearing itself. Assuming that one of the support rings such as the ring 39 is fixed to the frame of the machine then the ring 36 will shift axially during "breathing" of the frustoconical surfaces so as to compensate for axial and radial expansion of the light metal bearing. Inasmuch as the expansion is extremely small in relation to the diameter of the frustoconical surfaces, there is no danger that the bearing will tilt between the steel support rings. The pairs of cooperating frustoconical surfaces always lie flush one against the other and the inclination of the frustoconical surfaces is not self-locking so that when the bearing cools the return of the parts by the springs 34 is assured.

The light metal alloy for the ring to be taken consists of an alloy with the following alloy ingredients in percent: 2.5–5% copper, 0.2–1.8% magnesium, 0.3–1.5% manganese, rest aluminum. These alloys are naturally aging. Particularly, an alloy with the following ingredients in percent is to be taken: 3.8–5.2% zinc, 2.4–3.8% magnesium, 0.5–1.5% copper, rest aluminum. This alloy can be aged artificially.

It will be understood that each of the elements described above, or two or more together, may also find a useful application in other types of bearings differing from the types described above.

While the invention has been illustrated and described as embodied in light metal bearings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for manufacturing bearing races, the steps of heating a high strength light metal alloy ring of uniform cross section to a temperature higher than the solubility temperature of the alloy; then quenching the thus heated ring; then uniformly increasing the diameter of the ring to a diameter where the ring remains permanently at the increased diameter; and then machining the ring to a desired cross sectional configuration.

2. In a process for manufacturing bearing races, the steps of heating a high strength light metal alloy ring of uniform cross section to a temperature higher than the solubility temperature of the alloy; then quenching the thus heated ring; then uniformly increasing the diameter of the ring to a diameter where the ring remains permanently at the increased diameter; then aging the ring of increased diameter; and finally machining the aged ring to a desired cross sectional configuration.

3. In a process for manufacturing bearing races, the steps of heating a high strength light metal alloy ring of uniform cross section to a temperature higher than the solubility temperature of the alloy; then quenching the thus heated ring; then uniformly increasing the diameter of the ring to a diameter where the ring remains permanently at the increased diameter; and then artificially aging the ring of increased diameter.

4. In a process as recited in claim 1, said light metal alloy being an alloy of aluminum, zinc, magnesium, and copper.

5. In a process as recited in claim 1, said ring being machined to a uniform cross section just prior to the step of increasing the diameter thereof.

6. In a process for manufacturing bearing races, the steps of heating a light metal alloy ring of uniform cross-section to a temperature higher than the solubility temperature of the alloy, said light metal alloy being an alloy of aluminum, zinc, magnesium, and copper, said zinc being present in an amount of 3.8–5.2%, said magnesium being present in an amount of 2.4–3.8%, said copper being present in an amount of 0.5–1.5%; then quenching the thus heated ring; then uniformly increasing the diameter of the ring to a diameter where the ring remains permanently at the increased diameter; and then machining the ring to a desired cross-sectional configuration.

7. In a process as recited in claim 6, said alloy being artificially aged.

8. In a process for manufacturing bearing races, the steps of heating a light metal alloy ring of uniform cross-section to a temperature higher than the solubility temperature of the alloy, said light metal alloy being an alloy of aluminum, copper, magnesium, and manganese, said copper being present in an amount of 2.5–5%, said magnesium being present in an amount of 0.2–1.8%, and said manganese being present in an amount of 0.3–1.5%; then quenching the thus heated ring; then uniformly increasing the diameter of the ring to a diameter where the ring remains permanently at the increased diameter; and then machining the ring to a desired cross-sectional configuration.

9. In a process as recited in claim 8, said alloy being naturally aged.

References Cited in the file of this patent

UNITED STATES PATENTS

| | | |
|---|---|---|
| 1,836,112 | Ganster | Dec. 15, 1931 |
| 2,461,566 | Morrill | Feb. 15, 1949 |
| 2,514,526 | Thibeaux | July 11, 1950 |
| 2,766,512 | Hatebur | Oct. 16, 1956 |
| 2,803,508 | Nilsson et al. | Aug. 20, 1957 |
| 2,852,836 | McNicoll | Sept. 23, 1958 |
| 2,900,288 | Pelzel | Aug. 18, 1959 |
| 2,982,677 | Pelzel | May 2, 1961 |